United States Patent
Pees

(10) Patent No.: US 7,272,072 B1
(45) Date of Patent: Sep. 18, 2007

(54) METHOD OF CONVERTING RECEIVED DATA TO A TWO-DIMENSIONAL COLOR MAP

(75) Inventor: Edward H. Pees, Exeter, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/518,738

(22) Filed: Sep. 8, 2006

(51) Int. Cl.
  *G01S 15/89* (2006.01)
(52) U.S. Cl. .......................................... 367/110; 367/88
(58) Field of Classification Search .................. 367/88, 367/110, 135
  See application file for complete search history.

(56) References Cited

U.S. PATENT DOCUMENTS 5,541,893 A * 7/1996 Smith .......................... 367/135

2006/0109745 A1 * 5/2006 Bouyoucos et al. ........ 367/135

* cited by examiner

*Primary Examiner*—Ian J. Lobo
(74) *Attorney, Agent, or Firm*—James M. Kasischke; Michael P. Stanley; Jean-Paul A. Nasser

(57) ABSTRACT

Beams of sampled data are converted into a two-dimensional color map thereof. Fourier transforms are performed on range cells of each beam with each transform being sampled M times where M is defined by M discrete sets of red, green and blue intensity values of a color spectrum. For each range cell in each beam, each sample of the corresponding M-sampled Fourier transform is multiplied by a corresponding one of the red, green and blue intensity values from a corresponding one of the M discrete sets thereof. Each of the resulting M red values, M green values and M blue values are averaged. As a result, a triplet is defined for each range cell by the averaged values. For each triplet, the minimum thereof is used to reduce the triplet's averaged values to thereby form a corresponding re-valued triplet. The resulting array of re-valued triplets are normalized across all of the range cells with the resulting array of re-valued triplets so-normalized being used to generate a two-dimensional color display.

9 Claims, 2 Drawing Sheets

METHOD OF CONVERTING RECEIVED DATA TO A TWO-DIMENSIONAL COLOR MAP

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates generally to acoustic signal processing, and more particularly to a method of converting broadband acoustic data into a two-dimensional color map representation thereof.

(2) Description of the Prior Art

Conventional underwater active target detection and classification has traditionally relied primarily on echo intensity as the mechanism of operation. While these types of sonar systems can produce very-good images of the underwater acoustic scene, the images can also present ambiguous situations that can lead to improper interpretation thereof.

SUMMARY OF THE INVENTION

Accordingly, it is an object of the present invention to provide a method of processing underwater acoustic data for visual interpretation.

Another object of the present invention is to provide a method of processing underwater acoustic data that can be used in the characterization of an underwater environment as is required in, for example, underwater detection and classification applications.

Other objects and advantages of the present invention will become more obvious hereinafter in the specification and drawings.

In accordance with the present invention, a method is provided to convert beams of sampled acoustic data into a two-dimensional color map thereof. A Fourier transform is performed on each range cell of each beam. Each Fourier transform is sampled M times to generate a corresponding M-sampled Fourier transform. The value of M comes from a provided color spectrum that is defined by M discrete sets of red, green and blue intensity values. For each range cell in each beam, each sample of the corresponding M-sampled Fourier transform is multiplied by a corresponding one of the red, green and blue intensity values from a corresponding one of the M discrete sets thereof. This generates M red values, M green values and M blue values for each range cell in each beam. Next, for each range cell in each beam, (i) the M red values are averaged to generate an averaged red value, (ii) the M green values are averaged to generate an averaged green value, and (iii) the M blue values are averaged to generate an averaged blue value. As a result, a triplet is defined for each range cell by the averaged values. Next, for each triplet, the minimum of the triplet's averaged red value, averaged green value and averaged blue value is used to reduce the triplet's averaged values to thereby form a corresponding re-valued triplet. The resulting array of re-valued triplets are normalized across all of the range cells. The resulting array of re-valued triplets so-normalized is used to generate a two-dimensional color display.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Traditionally, the frequency of underwater acoustic data has been used only to the extent of Doppler shifting due to target motion. However, with the advent of broadband active acoustic sonar systems, the method of the present invention is a viable alternative to the characterization of an underwater environment. Such characterization can be used, for example, in underwater target detection and classification.

Briefly, for a broadband acoustic waveform given by x(t) and the acoustic impulse response of an arbitrary underwater scatterer given by h(t) (limited to the bandwidth of x(t)), the convolution integral y(t) describing the echo from this scatterer is simply $$y(t)=\int x(\tau)h(t-\tau)d\tau. \qquad (1)$$

By the convolution theorem, this integral has a Fourier transform given by $$F(\omega)=X(\omega)H(\omega) \qquad (2)$$

where $X(\omega)$ represents the Fourier transform of the broadband waveform, and $H(\omega)$ represents the acoustic frequency response of the scatterer over the bandwidth of the waveform. From this expression, the spectrum of the received signal corresponding to any particular location r will simply be the spectrum of the broadband waveform modulated by the position-dependent environmental frequency response $H(r,\omega)$).

The above-described situation is analogous to that of color vision in which an arbitrary scene illuminated with broadband light (e.g., sunlight) will reflect only those colors filtered by the optical frequency responses of the various objects in the scene. In the present invention, the visible scene is obtained by mapping the acoustical frequency responses to a visible spectrum.

The above concept is realized using conventional beam data gathered by a broadband acoustic sensor over an arbitrary sector of adjacent beams. The process of the present invention will be described with the aid of FIG. 1 which depicts a flow chart of the present invention's method steps along with corresponding graphic aids to help the reader understand the method steps.

Figure 1:
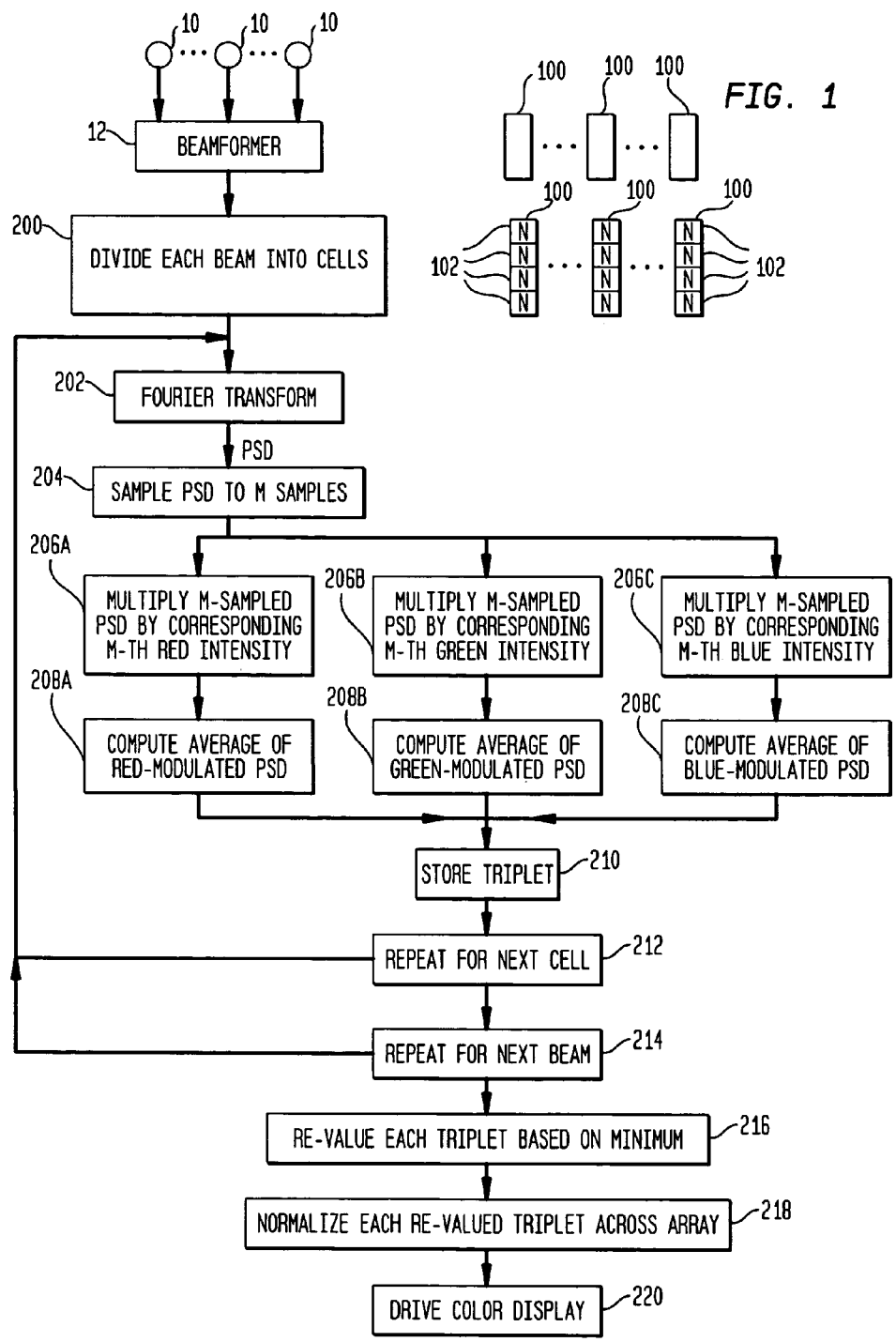
FIG. 1 is a flow diagram of a method of converting acoustic data into a two-dimensional color map thereof in accordance with the present invention.

In FIG. 1, hydrophones 10 are arranged in an array. Hydrophones 10 are coupled to a beamformer 12 which is used to generate corresponding beams 100 of acoustic data as would be well understood by one of ordinary skill in the art.

At step 200, each beam 100 is divided into a subset of range bins or cells 102 with each cell 102 containing N samples of data. The number of samples N should be sufficiently large to permit an accurate Fourier analysis to be performed for each cell 102. The sampled data in a cell 102 is Fourier-transformed at step 202 to obtain a band-limited power spectral density (PSD) curve for the cell. The range of frequencies over which the power spectral density curves are computed will be the same for all cells to provide for a straightforward mapping to an optical spectrum.

Figure 2:
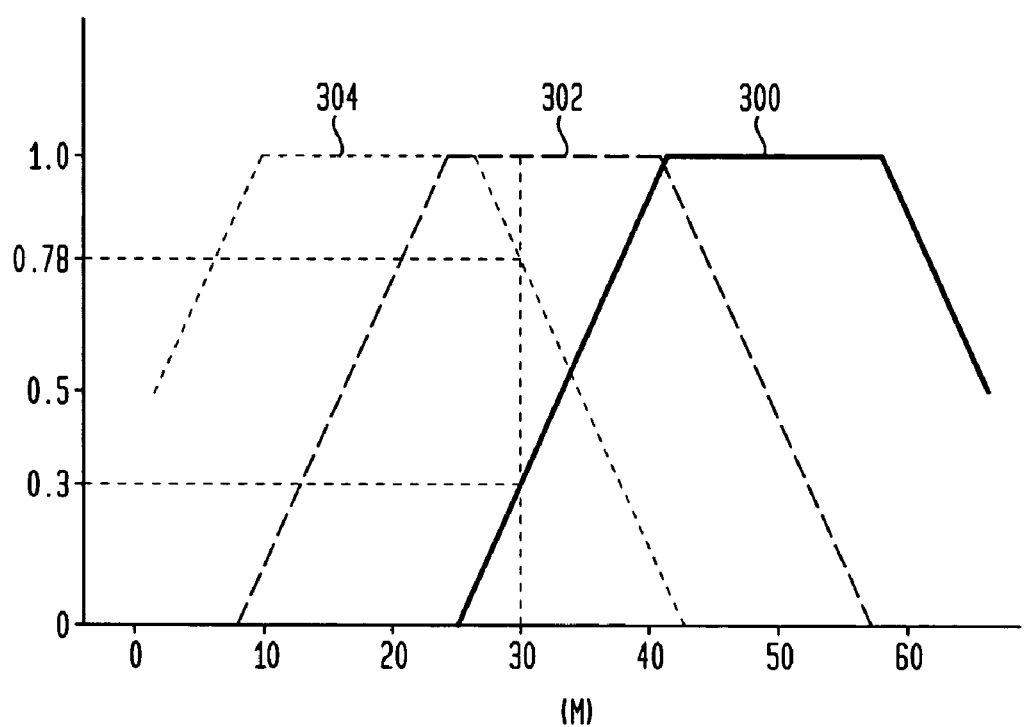
FIG. 2 is a graphic depiction of an exemplary color spectrum used in the method of the present invention.

The optical spectrum used in the mapping process can be any color spectrum that is (typically) made up of red (R), green (G) and blue (B) intensity values. By way of illustrative example, one such color spectrum is illustrated in FIG. 2 where solid curve 300 represents red values, dashed line curve 302 represent green values, and dotted line curve 304 represents blue values. Other choices of spectral shape and overlap could be used without departing from the scope of the present invention. In the present invention, the provided/ selected color spectrum is described by M discrete sets of (R, G, B) values where each set's R, G, B values range from zero to one. For example, in the illustrated color spectrum, the (R, G, B) set for M=30 is defined as (0.30, 1.0, 0.78). Thus, the relative values for the M discrete sets define a color spectrum as would be understood in the art.

The mapping from the acoustic spectra to this visible spectrum is achieved by first re-sampling (at step 204) each cell's computed power spectral density curve to the number of points in the visible color map (i.e., in general, this is M points). Then, at steps 206A, 206B and 206C, each of the M samples of the PSD curve for a cell 102 is multiplied by the corresponding M-th red intensity value (at step 206A), M-th green intensity value (at step 206B), and M-th blue intensity value (at step 206C) individually. Fusing the color spectrum illustrated in FIG. 2, the 30-th sample of the PSD would be multiplied by (i) 0.30 in step 206A, (ii) 1.0 in step 206B, and (iii) 0.78 in step 206C.

Next, at steps 208A, 208B and 208C, an average value is computed for each cell using the red-modulated PSD values (step 208A), the green-modulated PSD values (step 208B) and the blue-modulated PSD values (step 208C). These two operations have the effect of creating overall red, green and blue intensity contributions for each cell. The three averaged values (computed by steps 208A, 208B and 208C) for each cell form a triplet that can be stored at step 210. This process (i.e., steps 202 through 208) is repeated for all cells in a beam (step 212) and all beams in the array (step 214). The result of performing these steps for all cells and all beams is a two-dimensional "I-by-J" array of red, green and blue intensity triplets, where "I" is the number of beams and "J" is the number of range cells per beam. This process (i.e., steps 202 through 208) is repeated for all cells in a beam (step 212) and all beams in the array (step 214).

Once all triplets have been formed for all cells/beams (i.e., for the entire array), processing proceeds to step 216. Specifically, the minimum value of each triplet is subtracted from each of the values in that triplet, thereby creating a minimum value of zero for all triplets in the array. For example, if a triplet were defined by the averaged values (0.5, 0.3, 0.8), the triplet would be re-valued as follows:

((0.5−0.3), (0.3−0.3), (0.8−0.3))

or (0.2, 0.0, 0.5).

This step is required in order to give each cell the same 'saturation' value. The saturation value of a color determines the level of whiteness contained therein. A lower saturation value corresponds to more whiteness. Setting the minimum value of each triplet to zero therefore removes any whiteness from the cells since saturation is defined as one minus the minimum of the triplet values.

The next step 218 involves the separate normalization all of the red intensity values (i.e., all of the red intensity values resulting from step 216) to the maximum red intensity value in the array. Similar normalization is performed on the green intensity values for the array and the blue intensity values for the array. The motivation for this step is to create a constant 'value' for all cells. The 'value' of a color (from hue, saturation, value) is effectively the intensity of the color, and is defined by the maximum value of the red, green or blue component of the color. Once achieved, the only distinguishing characteristic remaining is the 'hue' of the cell. The hue is effectively the raw color of the cell, and is the desired quantity for characterizing the variation in the frequency response of the underwater environment.

Once the above operations have been completed, an array of red-green-blue triplets is in the correct form for driving a color display. Accordingly, this array of triplets drives a two-dimensional color display at step 220.

The advantages of the present invention are numerous when compared to conventional sonar signal processing methods. Foremost is an alternative approach for detecting and potentially classifying underwater targets by exploiting the uniqueness of their acoustic frequency responses. It should be noted that refinements to this approach could lead to the ability to classify a target merely by its acoustic color. That is, by virtue of their unique physical structure, submerged vessels yield a different broadband echo spectrum than naturally occurring objects or even other man-made objects. Another benefit of this method is its unique capability to characterize the underwater environment by examining the variations in a color representation thereof. For instance, a single ping can reveal the extent to which reverberation dominates the environment or the location of possible shadow zones. Furthermore, when combined with existing sonar processing approaches, this method could provide a desirable tactical advantage over an opponent relying only on conventional detection methods.

This invention can be broadly applied to any system that receives data from an array of sensors over a range of frequencies. The array of sensors is used to provide data that can be beamformed, and the range of frequencies and intensities is used as the source of the color. For example, this system is clearly applicable to a radar array. This method could also be applicable to a passive array of sensors such as a passive sonar array or radar array.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of converting sensor array data into a two-dimensional color map thereof, comprising the steps of:
   providing adjacent beams of sensor array data;
   dividing each of said beams into a plurality of cells with each of said cells having N samples of said sensor array data associated therewith;
   generating a power spectral density (PSD) curve for each of said cells in each of said beams using said N samples associated therewith;
   providing a color spectrum defined by M discrete sets of red, green and blue intensity values;
   generating M samples of said PSD curve for each of said cells in each of said beams;
   multiplying, for each of said cells in each of said beams, each of said M samples of said PSD curve by a corresponding one of said red, green and blue intensity values from a corresponding one of said M discrete sets to generate, for each of said cells in each of said beams, M red values, M green values and M blue values;

averaging, for each of said cells in each of said beams, (i) said M red values to generate an averaged red value, (ii) said M green values to generate an averaged green value, and (iii) said M blue values to generate an averaged blue value, wherein a triplet is defined for each of said cells by said averaged red value, said averaged green value and said averaged blue value;

selecting, for each said triplet, a minimum from said averaged red value, said averaged green value and said averaged blue value associated therewith;

reducing, for each said triplet, said averaged red value, said averaged green value and said averaged blue value associated therewith, by the value of said minimum wherein a corresponding re-valued triplet is formed and is defined by a revalued red value, a revalued green value and a revalued blue value;

normalizing, across all of said cells, said revalued red value, said revalued green value and said revalued blue value associated with each said re-valued triplet; and generating a two-dimensional display using each said re-valued triplet so-normalized.

2. A method according to claim 1 wherein said step of generating said PSD is performed over a frequency band that is the same for each of said cells.

3. A method according to claim 1 wherein said sensor array data comprises acoustic data.

4. A method of converting beams of sampled sensor array data into a two-dimensional color map thereof, comprising the steps of:

performing a Fourier transform on range cells of said beams;

providing a color spectrum defined by M discrete sets of red, green and blue intensity values;

sampling each said Fourier transform M times to generate a corresponding M-sampled Fourier transform;

multiplying, for each of said range cells in each of said beams, each sample of said corresponding M-sampled Fourier transform by a corresponding one of said red, green and blue intensity values from a corresponding one of said M discrete sets to generate, for each of said range cells in each of said beams, M red values, M green values and M blue values;

averaging, for each of said range cells in each of said beams, (i) said M red values to generate an averaged red value, (ii) said M green values to generate an averaged green value, and (iii) said M blue values to generate an averaged blue value, wherein a triplet is defined for each of said cells by said averaged red value, said averaged green value and said averaged blue value;

selecting, for each said triplet, a minimum from said averaged red value, said averaged green value and said averaged blue value associated therewith;

reducing, for each said triplet, said averaged red value, said averaged green value and said averaged blue value associated therewith, by the value of said minimum wherein a corresponding re-valued triplet is formed and is defined by a revalued red value, a revalued green value and a revalued blue value;

normalizing, across all of said range cells, said revalued red value, said revalued green value and said revalued blue value associated with each said re-valued triplet; and generating a two-dimensional display using each said re-valued triplet so-normalized.

5. A method according to claim 4 wherein said step of performing uses a frequency band that is the same for each of said range cells.

6. A method according to claim 4 wherein said sensor array data comprises acoustic data.

7. A method of converting beams of sampled sensor array data into a two-dimensional color image thereof, comprising the steps of:

generating a power spectral density (PSD) curve for range cells in each of said beams;

providing a color spectrum defined by M discrete sets of red, green and blue intensity values;

sampling each said PSD curve M times to generate a corresponding M-sampled PSD;

multiplying, for each of said range cells in each of said beams, said M-sampled PSD associated therewith times a corresponding one of said red, green and blue intensity values from a corresponding one of said M discrete sets to generate, for each of said range cells in each of said beams, M red values, M green values and M blue values;

averaging, for each of said range cells in each of said beams, (i) said M red values to generate an averaged red value, (ii) said M green values to generate an averaged green value, and (iii) said M blue values to generate an averaged blue value, wherein a triplet is defined for each of said range cells by said averaged red value, said averaged green value and said averaged blue value;

selecting, for each said triplet, a minimum from said averaged red value, said averaged green value and said averaged blue value associated therewith;

reducing, for each said triplet, said averaged red value, said averaged green value and said averaged blue value associated therewith, by the value of said minimum wherein a corresponding re-valued triplet is formed and is defined by a revalued red value, a revalued green value and a revalued blue value;

normalizing, across all of said range cells, said revalued red value, said revalued green value and said revalued blue value associated with each said re-valued triplet, wherein an I×J array of re-valued triplets so-normalized is formed where I is the number of said beams and J is the number of said cells in each of said beams; and generating a two-dimensional image using said I×J array of re-valued triplets so-normalized.

8. A method according to claim 7 wherein said step of generating said PSD is performed over a frequency band that is the same for each of said range cells.

9. A method according to claim 7 wherein said sampled sensor array data comprises sampled broadband acoustic data.

* * * * *